Feb. 4, 1930.   J. A. CARY   1,746,102
HOSE AND PIPE CLAMP
Filed May 31, 1929

John A. Cary, INVENTOR
BY Victor J. Evans
ATTORNEY

WITNESS:

Patented Feb. 4, 1930

1,746,102

UNITED STATES PATENT OFFICE

JOHN A. CARY, OF LARAMIE, WYOMING

HOSE AND PIPE CLAMP

Application filed May 31, 1929. Serial No. 367,467.

This invention relates to new and useful improvements in hose clamps designed for immediate application upon hose lines and the like while under high pressure whereby a leak may be repaired without cutting off the flow therethrough.

Another object of the invention contemplates the provision and arrangement of means whereby the clamp may be readily and conveniently passed around the damaged portion of the hose.

An additional object of the invention embodies a locking mechanism for the clamp.

A further object of the invention embodies an operating lever to facilitate shifting of the component parts of the clamp to locking positions.

With the above and other objects in view, the invention further consists of the following novel features and details of construction, to be hereinafter more fully described, illustrated in the accompanying drawing and pointed out in the appended claims.

In the drawing:—

Figure 1:
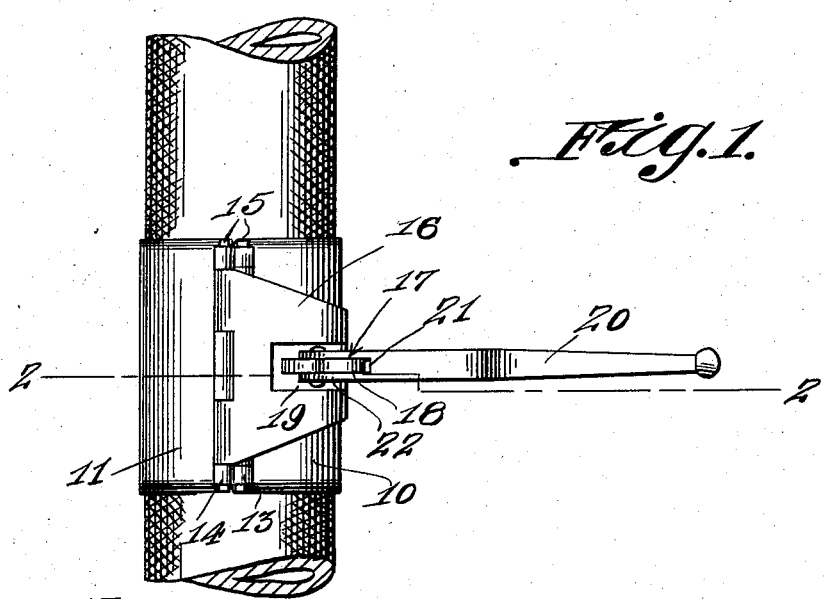
Figure 1 is a top plan view of my invention as applied and in use.

Referring to the drawing in detail wherein like characters of reference denote corresponding parts, the reference characters 10 and 11 indicate elongated semi-circular complemental sections having a common hinge barrel connection 12 established at the juncture of contact of the meeting side edges thereof and from which said sections may swing to be coupled around the damaged portion of a pipe or hose line. The remaining side edges of the sections terminate to provide sleeve portions 13 and 14 respectively, each of which carries a pin or shaft 15 within the bore thereof to strengthen the sleeves and prevent displacement of same when subjected to excessive strain.

A slotted plate or hasp 16, of curvilinear formation, is hingedly connected at one end with the shaft member or pin 15 passed through the bore of the sleeve 14. The hasp or plate 16 is designed to extend and overlie the adjacent outer surface of the semi-circular section 10 when the clamp is passed around and about a pipe or hose line. A locking element, in the nature of a cam 17 having a curved outer edge 18 to engage and slide against the end wall of the slot in the hasp or plate 16, is horizontally disposed upon the outer surface of the section 10 and upon that portion of the latter to be covered by said hasp.

Figure 2:
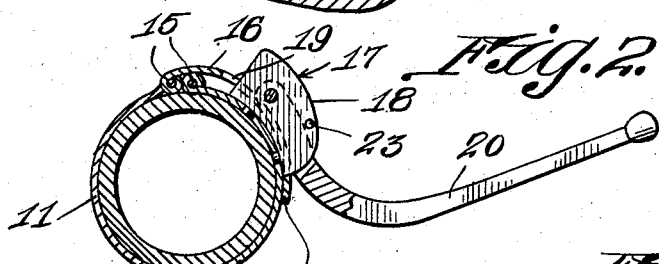
Figure 2 is a horizontal sectional view taken on line 2—2 of Figure 1 through the pipe, the clamp and the operating lever.

The cam or locking element 17 is shaped to provide a shoulder or notch 19 at the end of the curved outer side edge 18 which is engaged by the aforementioned end wall of the slot in the hasp or plate 16 after the latter has been shifted to occupy the position shown in Figure 2 of the drawing.

To accomplish closing of the sections about a pipe or hose line and locking of the hasp or plate 16, I provide an operating handle or lever 20, bifurcated as at 21, to define arms 22 extended in parallelism upon the opposite sides of the cam or locking element 17 and pivotally mounted thereon. The depth of the bifurcation or slot 21 is sufficient to clear the end and shoulder portion upon the locking element or cam 17 when shifted to effect locking connection between said cam and the hasp or plate 16.

If desired, the locking element or plate 17 may be drilled or otherwise apertured, as indicated at 23, to facilitate reception of a pin, not shown, subsequent to the disposition of the operating lever 20 in the Figure 2 position to lock same against displacement when the shoulder portion of the cam and the end wall of the slot in the hasp or plate 16 have become worn incident to use.

Figure 3:
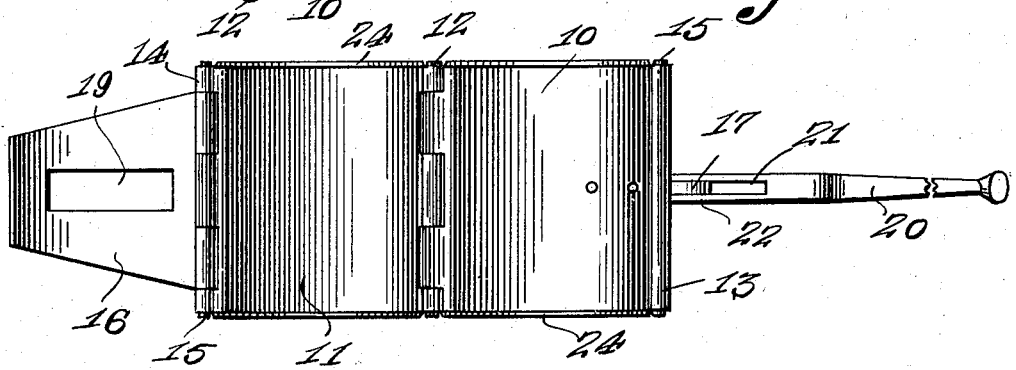
Figure 3 is a plan view of the entire clamp including the locking and operating mechanisms therefor.

From an inspection of Figure 3 of the drawing, it is noted that the ends of the sections 10 and 11 are rolled or otherwise distorted, as indicated at 24, to project the edges of the sections toward the pipe or hose line to prevent longitudinal sliding movement of the assembled clamp and to secure any form of packing thereabout. Said edges will also prevent leakage from the ends of the assembled clamp.

The present invention offers a convenient method and means whereby leaks in fire hose lines and the like may be immediately repaired while under pressure.

The invention is susceptible of various changes in its form, proportions and minor details of construction, and the right is herein reserved to make such changes as properly fall within the scope of the appended claims.

Having thus described the invention, what is claimed is:—

1. A pipe clamp comprising semi-circular hingedly connected sections, a hasp swingably mounted upon one of the sections being of curvilinear formation to overlie the adjacent portion of the companion section, a locking element carried upon the other of the sections upon that portion covered by the hasp and projected through the slot in the latter, a shoulder portion formed upon one end of the locking element, and means included at the ends of the sections grippingly engaging the pipe line as the locking connection is established.

2. A pipe clamp comprising semi-circular hingedly connected sections, a hasp swingably mounted upon one of the sections being of curvilinear formation to overlie the adjacent portion of the companion section, a locking element carried upon the other of the sections upon that portion covered by the hasp and projected through the slot in the latter, a shoulder portion formed upon one end of the locking element engageable with the adjacent end wall of the hasp slot, means included at the ends of the sections grippingly engaging the pipe line as the locking connection is established, and an operating lever carried by the locking element.

In testimony whereof I affix my signature.

JOHN A. CARY.